(12) United States Patent
Ikegami et al.

(10) Patent No.: US 12,181,567 B2
(45) Date of Patent: Dec. 31, 2024

(54) OBJECT DETECTION METHOD AND OBJECT DETECTING DEVICE

(71) Applicant: Nissan Motor Co., Ltd., Yokohama (JP)

(72) Inventors: Takashi Ikegami, Kanagawa (JP); Kuniaki Noda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/280,022

(22) PCT Filed: Mar. 3, 2021

(86) PCT No.: PCT/IB2021/000123
§ 371 (c)(1),
(2) Date: Sep. 1, 2023

(87) PCT Pub. No.: WO2022/185085
PCT Pub. Date: Sep. 9, 2022

(65) Prior Publication Data
US 2024/0248196 A1 Jul. 25, 2024

(51) Int. Cl.
*G01S 13/86* (2006.01)
*G01J 5/00* (2022.01)
(Continued)

(52) U.S. Cl.
CPC ........... *G01S 13/867* (2013.01); *G01J 5/00* (2013.01); *G01S 13/58* (2013.01); *G01S 13/931* (2013.01);
(Continued)

(58) Field of Classification Search
CPC ...... G01S 13/867; G01S 13/58; G01S 13/931; G01S 2013/93275; G01S 7/024; G01S 13/89; G01S 13/953; G01S 17/87; G01S 17/931; G01J 5/00; G01J 2005/0077; G06V 20/56; G08G 1/166; G08G 1/048
See application file for complete search history.

(56) References Cited

U.S. PATENT DOCUMENTS 5,202,692 A * 4/1993 Huguenin ............... G01S 7/024
250/332
5,899,984 A * 5/1999 Wang .................... G01S 13/931
706/16
(Continued)

FOREIGN PATENT DOCUMENTS

CN 103303205 A 9/2013
EP 3456597 A2 3/2019
(Continued)

*Primary Examiner* — Bernarr E Gregory
(74) *Attorney, Agent, or Firm* — Young Basile Hanlon & MacFarlane, P.C.

(57) ABSTRACT

An object detection method includes irradiating a position in front of a host-vehicle with an electromagnetic wave, and detecting an object in front of the host-vehicle based on a reflected wave of the electromagnetic wave. The object detection method further includes capturing an image of the position in front of the host-vehicle to acquire an image, and determining whether the object is floating matters based on the acquired image if a state where the object is not detected changes to a state where the object is detected.

12 Claims, 15 Drawing Sheets

(51) Int. Cl.
*G01S 13/58* (2006.01)
*G01S 13/931* (2020.01)
*G06V 20/56* (2022.01)

(52) U.S. Cl.
CPC ...... *G06V 20/56* (2022.01); *G01J 2005/0077* (2013.01); *G01S 2013/93275* (2020.01)

(56) References Cited

U.S. PATENT DOCUMENTS

| | | | | |
|---|---|---|---|---|
| 11,194,043 | B2* | 12/2021 | Meehan | G01S 13/931 |
| 11,402,498 | B1* | 8/2022 | Dana | G01S 13/953 |
| 11,480,686 | B2* | 10/2022 | Bhaskaran | G01S 7/4876 |
| 11,740,335 | B2* | 8/2023 | Bhaskaran | G01S 17/87 |
| | | | | 701/27 |
| 2011/0279303 | A1* | 11/2011 | Smith, Jr. | G01S 13/867 |
| | | | | 342/52 |
| 2013/0259309 | A1 | 10/2013 | Sekiguchi | |
| 2014/0198213 | A1* | 7/2014 | Liken | G06V 20/56 |
| | | | | 348/148 |
| 2014/0233805 | A1 | 8/2014 | Faber et al. | |
| 2014/0307247 | A1 | 10/2014 | Zhu et al. | |
| 2014/0324266 | A1 | 10/2014 | Zhu et al. | |
| 2014/0333468 | A1 | 11/2014 | Zhu et al. | |
| 2014/0336935 | A1 | 11/2014 | Zhu et al. | |
| 2021/0094538 | A1* | 4/2021 | Beller | G01S 17/931 |

FOREIGN PATENT DOCUMENTS

| | | |
|---|---|---|
| JP | 2009-110168 A | 5/2009 |
| JP | 2013-203337 A | 10/2013 |
| JP | 2013-206328 A | 10/2013 |
| JP | 2014024427 A | 2/2014 |
| JP | 2014-93028 A | 5/2014 |
| JP | 2014-518412 A | 7/2014 |
| JP | 2019-105648 A | 6/2019 |

* cited by examiner

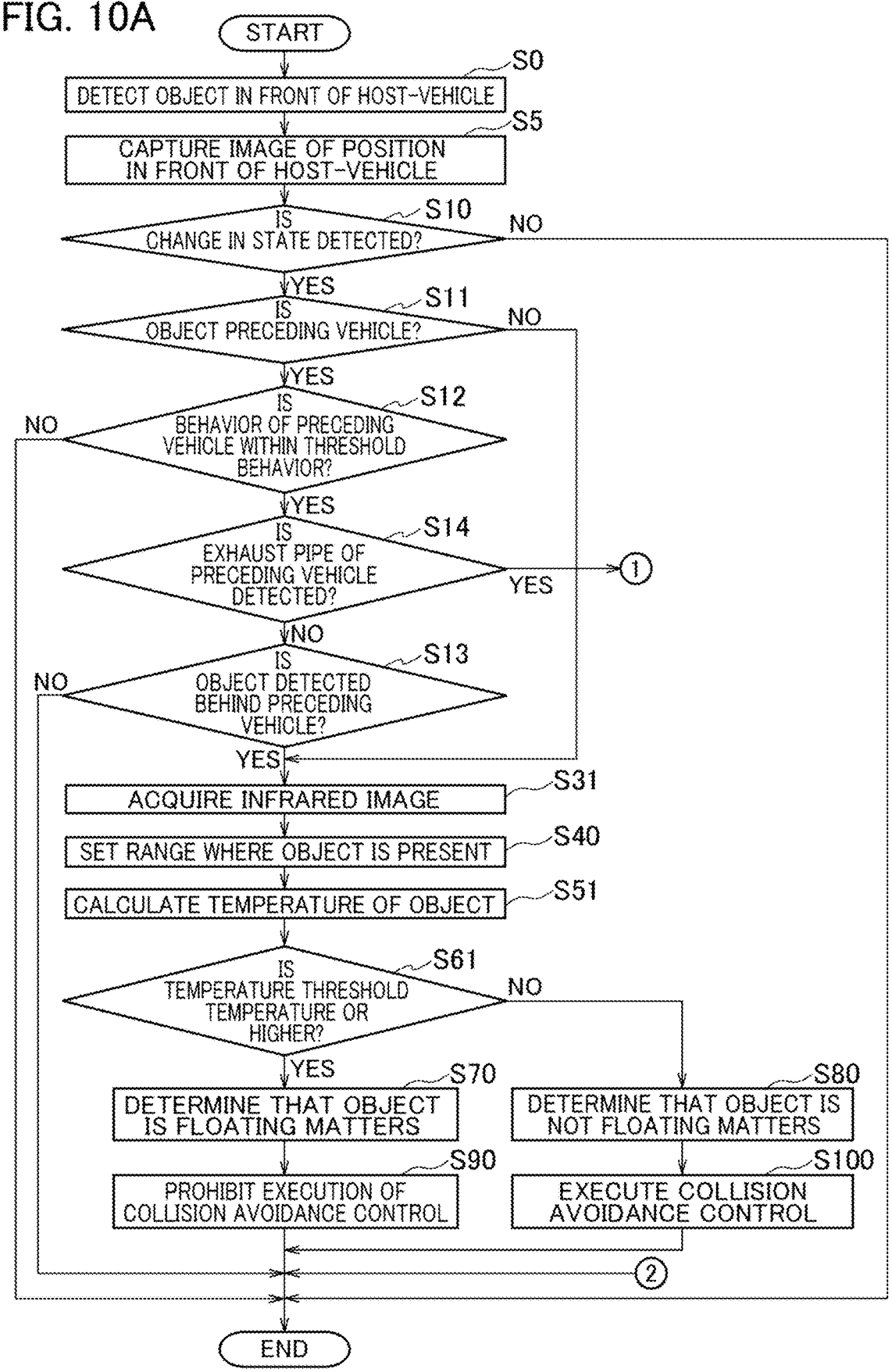

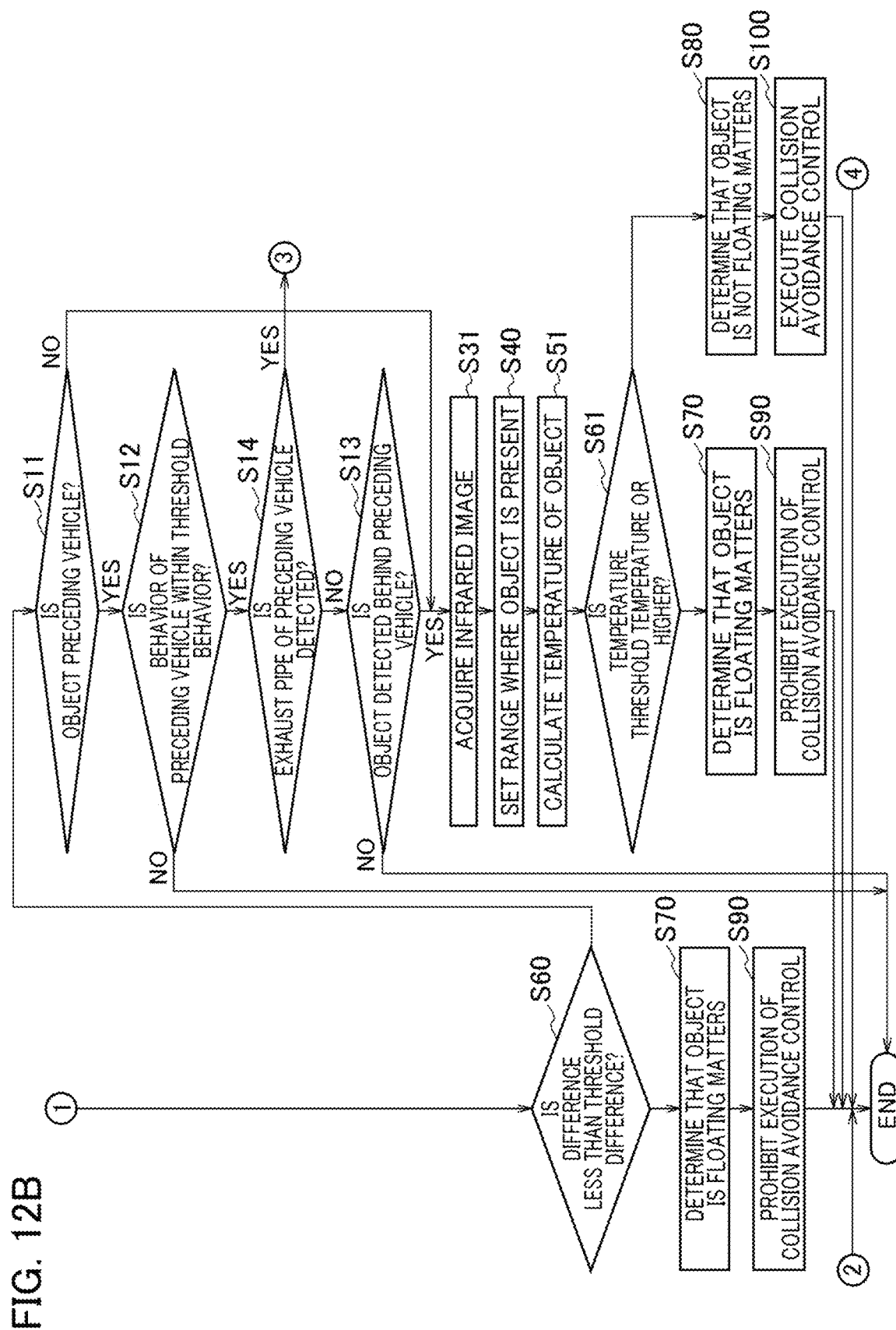

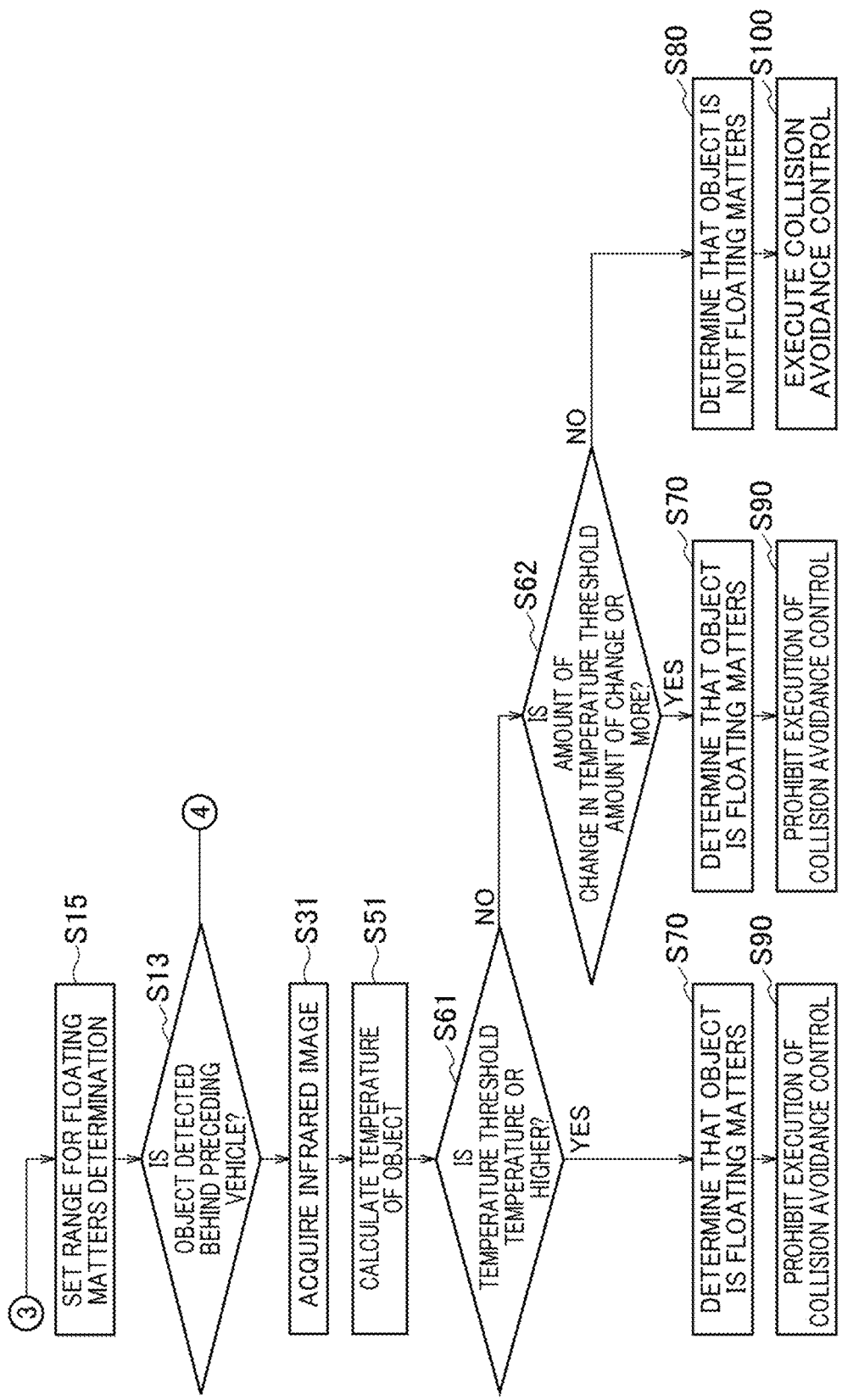

OBJECT DETECTION METHOD AND OBJECT DETECTING DEVICE

TECHNICAL FIELD

The present invention relates to an object detection method and an object detecting device.

BACKGROUND

There is a prior known object detecting device which can determine whether an object detected by using a sensor with low resolution is floating matters (see Japanese Unexamined Patent Application Publication No. 2014-93028). The object detecting device disclosed in Japanese Unexamined Patent Application Publication No. 2014-93028 calculates the rate of change in size of the object detected by the sensor per unit of time, and determines that the detected object is floating matters if the rate of change in size is more than a predetermined threshold.

However, in an environment where there is no wind and floating matters tends to stay still, the rate of change in size of the detected object (floating matters) per unit of time does not exceed the predetermined threshold, and the object detecting device disclosed in Japanese Unexamined Patent Application Publication No. 2014-93028 may not be able to determine that the detected object is floating matters.

SUMMARY

The present invention has been devised in consideration of the above problem, and an object of the present invention is to provide an object detection method that can more accurately determine whether a detected object is floating matters.

One aspect of the present invention provides an object detection method including: irradiating a position in front of a host-vehicle with an electromagnetic wave; and detecting an object in front of the host-vehicle based on a reflected wave of the electromagnetic wave. The object detection method further includes: capturing an image of the position in front of the host-vehicle to acquire an image; and determining whether the object is floating matters based on the acquired image if a state where the object is not detected changes to a state where the object is detected.

According to one aspect of the present invention, it is possible to determine more accurately whether a detected object is floating matters.

BRIEF DESCRIPTION OF THE DRAWINGS

FIG. 10A is a flowchart showing the processing in which the object detecting device according to the second embodiment determines whether an object is floating matters;

FIG. 12B is a flowchart showing the processing in which the object detecting device according to the third embodiment determines whether the object is floating matters; and FIG. 12C is a flowchart showing the processing in which the object detecting device according to the third embodiment determines whether the object is floating matters.

DETAILED DESCRIPTION

Figure 1:
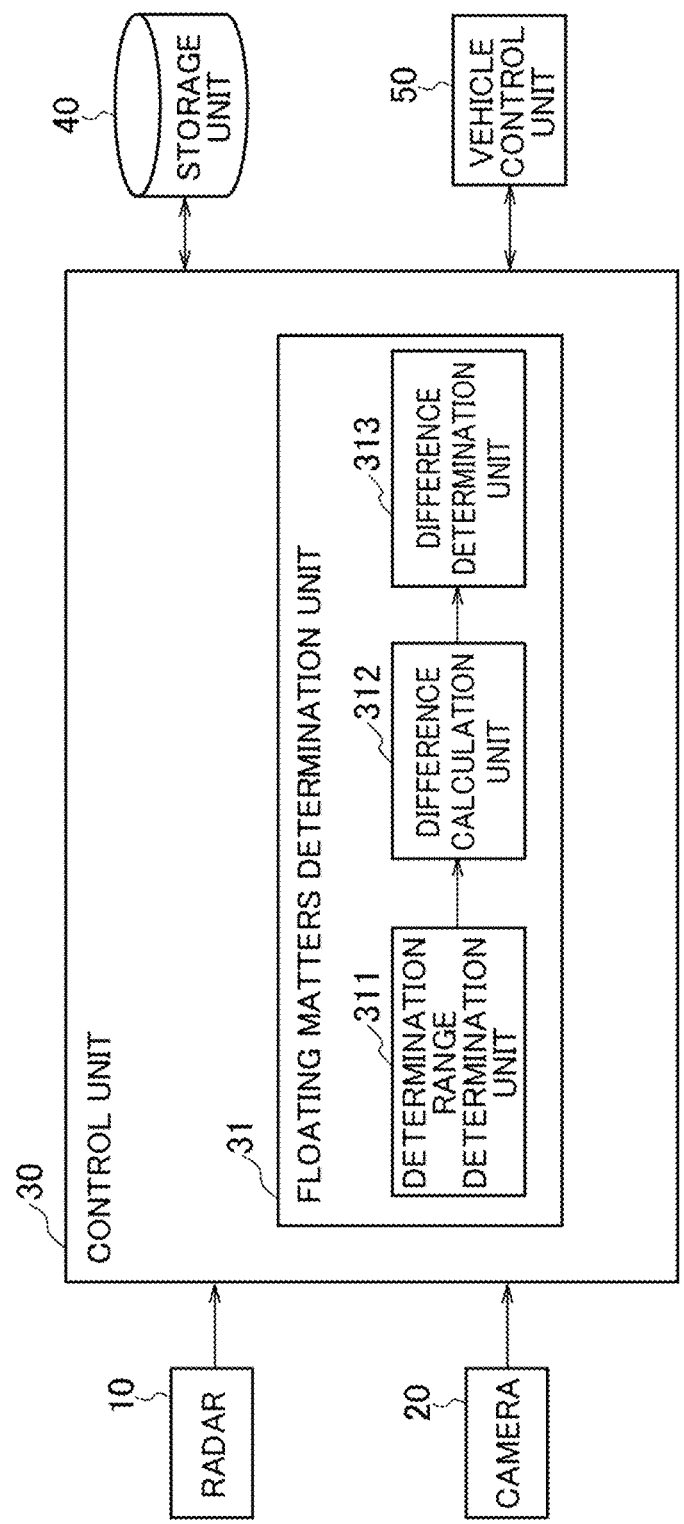
FIG. 1 is a block diagram showing the configuration of an object detecting device according to a first embodiment.

Embodiments will be described with reference to the accompanying drawings. In the illustration of the drawings, the same parts are denoted with the same reference numerals, and therefore, the description thereof is omitted.

First Embodiment

[Configuration of Object Detecting Device]

The configuration of an object detecting device according to a first embodiment will be described with reference to FIG. 1. The object detecting device detects an object in front of a host-vehicle and determines whether the object is floating matters. The object detecting device includes a radar 10, a camera 20, a control unit 30, and a storage unit 40.

The radar 10 is mounted in a front bumper or a front grille in front of the host-vehicle. The radar 10 is a sensor that irradiates a position in front of the host-vehicle with electromagnetic waves and detects an object in front of the host-vehicle based on reflected waves of the electromagnetic waves used for irradiation. At the same time as detecting the object, the radar 10 measures the orientation of the object, which is position information of the object, and the distance from the host-vehicle to the object, and calculates the position coordinates of the object based on the position of the host-vehicle. In addition, the radar 10 measures the speed of the object in addition to the aforementioned information. In the present embodiment, the radar is exemplified as means of detecting the object, but the object in front of the host-vehicle may be detected using a LiDER.

The camera 20 is mounted at a forward position in the vehicle interior of the host-vehicle. The camera 20 is used to repeatedly capture images of the position in front of the host-vehicle at a prescribed cycle to acquire multiple images of the position in front of the host-vehicle. Specifically, the camera 20 focuses a light ray from a subject on a planar light-receiving surface of an image sensor element by means of a lens to form an image of the subject, and acquires an optical image generated based on the brightness/darkness of the light of the formed subject image. The optical image is generated by light in a visible, infrared, or ultraviolet region. The camera 20 is used to repeatedly capture images of the position in front of host-vehicle and acquire multiple images until a state where an object is not detected changes to a state where an object is detected.

The control unit 30 is a general-purpose microcomputer including a central processing unit (CPU), a memory, and an input/output unit. A computer program for causing the microcomputer to function as the control unit 30 is installed in the microcomputer. By executing the computer program, the microcomputer functions as multiple information processing circuits of the control unit 30.

The present embodiment presents an example where the multiple information processing circuits of the control unit 30 are realized by software. However, it is also possible to configure each information processing circuit by preparing dedicated hardware for performing each information process described below. Further, the multiple information processing circuits may be configured by individual pieces of hardware.

The storage unit 40 is constituted by an information storage device including a hard disk drive (HDD) and a solid state drive (SSD). The storage unit 40 stores multiple images of the position in front of the host-vehicle captured by the camera 20 in a time-sequential manner. The storage unit 40 stores at least an image captured when an object is not detected until the state where an object is not detected changes to the state where an object is detected. That is, if the state where an object is not detected changes to the state where an object is detected, the storage unit 40 stores a second image of when the state changes to the state where an object is detected (hereinafter also referred to as a second optical image), and a first image of when an object is not detected (hereinafter also referred to as a first optical image) that is from one cycle or several cycles before the second image.

Note that the storage unit 40 stores multiple images that have been captured at a prescribed cycle in the past, and among the stored multiple images, the storage unit 40 specifies, as the second optical image, the image of when the state where an object is not detected changes to the state where an object is detected. Then, by specifying, as the first optical image, an image of when an object is not detected that is from one cycle or several cycles before, the storage unit 40 may store two or more multiple images including images other than the first optical image and the second optical image. In the present embodiment, the storage unit 40 stores images captured by the camera 20, but if the memory of the control unit 30 can store these pieces of data, the memory of the control unit 30 may store these pieces of data.

The control unit 30 and the storage unit 40 are mounted in the host-vehicle. The control unit 30 and the storage unit 40 may be mounted in the vehicle as one controller.

Here, the multiple information processing circuits of the control unit 30 will be specifically described.

The control unit 30 includes floating matters determination unit 31. The floating matters determination unit 31 determines whether an object detected by the radar 10 is floating matters based on an optical image captured by the camera 20. Floating matters are matters that are floating in the air, such as exhaust gas, a splash of water, or dust. That is, floating matters refer to a collection of fine particles that are floating in the air.

The floating matters determination unit 31 includes a determination range determination unit 311, a difference calculation unit 312, and a difference determination unit 313.

When detecting the change from the state where an object is not detected to the state where an object is detected, the determination range determination unit 311 acquires, from the camera 20, the second optical image, which is the image captured when the object is detected, and determines the range of the image for determining whether the object is floating matters. The processing performed by the determination range determination unit 311 will be specifically described below.

First, the determination range determination unit 311 detects that the state where an object is not detected has changed to the state where an object is detected based on information output from the radar 10. The information output from the radar 10 is, for example, a flag for indicating whether a state is the state where an object is detected. If the radar 10 outputs values, such as the orientation of the object constituting the position information of the object and the distance from the host-vehicle to the object, when the object is not detected, as invalid values (values that should not be used for control), the determination range determination unit 311 may use these values. The determination range determination unit 311 can detect that the state where an object is not detected has changed to the state where an object is detected by detecting a change in the value of the flag output from the radar 10 or the position information of the object.

Next, when detecting that the state where an object is not detected has changed to the state where an object is detected, the determination range determination unit 311 acquires, from the camera 20, the second optical image captured when the object is detected. The determination range determination unit 311 acquires the position information of the object from the radar 10, and selects a pixel area corresponding to the position of the object detected by the radar 10 from the second optical image. The radar 10 and the camera 20 are mounted in the host-vehicle and detect or capture an image of a range in front of the host-vehicle. Therefore, the position coordinates of the object output by the radar 10 and the pixel positions of the image acquired by the camera 20 are synchronized in advance. Therefore, the determination range determination unit 311 can select the pixel positions of the image corresponding to the position of the object detected by the radar 10. The determination range determination unit 311 sets the pixel area of the second optical image corresponding to the position of the object as the range of the image for determining whether the object is floating matters.

The difference calculation unit 312 calculates the difference between the first optical image captured when the object is not detected and the second optical image captured when the object is detected. Specifically, the difference calculation unit 312 acquires, from the storage unit 40, the first optical image captured when the object is not detected, and acquires, from the determination range determination unit 311, the second optical image and the pixel area corresponding to the position of the object, which is the range of the image for determining whether the object is floating matters. Then, the difference calculation unit 312 calculates the difference in at least one or more of brightness, chroma, and hue between the first optical image and the second optical image at the same pixel positions in the pixel area of the image for determining whether the object is floating matters. For example, if the image acquired by the camera 20 is a grayscale image, the difference calculation unit 312 calculates the difference in brightness. Further, if the image acquired by the camera 20 is a color image, differences in all of brightness, chroma, and hue may be calculated.

The difference determination unit 313 determines whether the difference between the first optical image and the second optical image calculated by the difference calculation unit 312 is less than a threshold difference. The difference between the first optical image and the second optical image when detecting floating matters such as exhaust gas, a splash of water, or dust (floating matters as a collection of floating fine particles) is smaller than the difference when detecting people and objects that obstruct vehicles such as a structure. Therefore, if the difference between the first optical image and the second optical image is less than the threshold difference, the difference determination unit 313 determines that the object is floating matters. Alternatively, if the difference between the first optical image and the second optical image is the threshold difference or more, the difference determination unit 313 determines that the object is not floating matters.

More specifically, in the pixel area of the image for determining whether the object is floating matters, if the percentage of pixels where the difference is less than the threshold difference is a threshold percentage or more, the difference determination unit 313 determines that the detected object is floating matters. The threshold difference and the threshold percentage can be determined by acquiring in advance, through experiments, the difference in brightness when floating matters is present and the pixel percentage where the difference in brightness is less than the threshold difference. If the optical image acquired by the camera 20 is a grayscale image and the brightness is processed with 8-bit data, for example, the threshold difference in brightness is 10 (0x10) in hexadecimal numbers and the threshold percentage is 70%.

Note that the method of determining whether the object is floating matters using the difference between the first optical image and the second optical image is not limited to the above. For example, the difference determination unit 313 may calculate the average value of the difference in the pixel area for determining whether the object is floating matters, and determine that the object is floating matters if the average value of the difference is less than a threshold average value.

A vehicle control unit 50 controls the host-vehicle and performs driving support and automatic driving based on information on the surroundings of the host-vehicle acquired by sensors which are mounted in the host-vehicle and include the radar 10 and the camera 20, and map data stored in advance in the storage unit 40. If the vehicle control unit 50 detects an object on the travel route of the host-vehicle and determines that there is a high possibility of the distance to the detected object becoming less than a predetermined distance determined in advance, the vehicle control unit 50 determines whether to control the host-vehicle to avoid a situation where the distance to the object becomes less than the predetermined distance, based on the result of determination as to whether the detected object is floating matters.

If the vehicle control unit 50 detects an object in front of the host-vehicle and determines that the detected object is not floating matters, the vehicle control unit 50 performs control to avoid a situation where the distance to the object becomes less than the predetermined distance. Specifically, the vehicle control unit 50 controls the vehicle such that the distance to the object is kept at the predetermined distance or more by prohibiting movement start control while waiting to start moving, and performing deceleration control or avoidance control by steering and driving the steering wheel during travelling.

If the vehicle control unit 50 detects an object in front of the host-vehicle and determines that the detected object is floating matters, the vehicle control unit 50 prohibits the execution of control to avoid the situation where the distance to the object becomes less than the predetermined distance.

[Object Detection Method]

Figure 2:
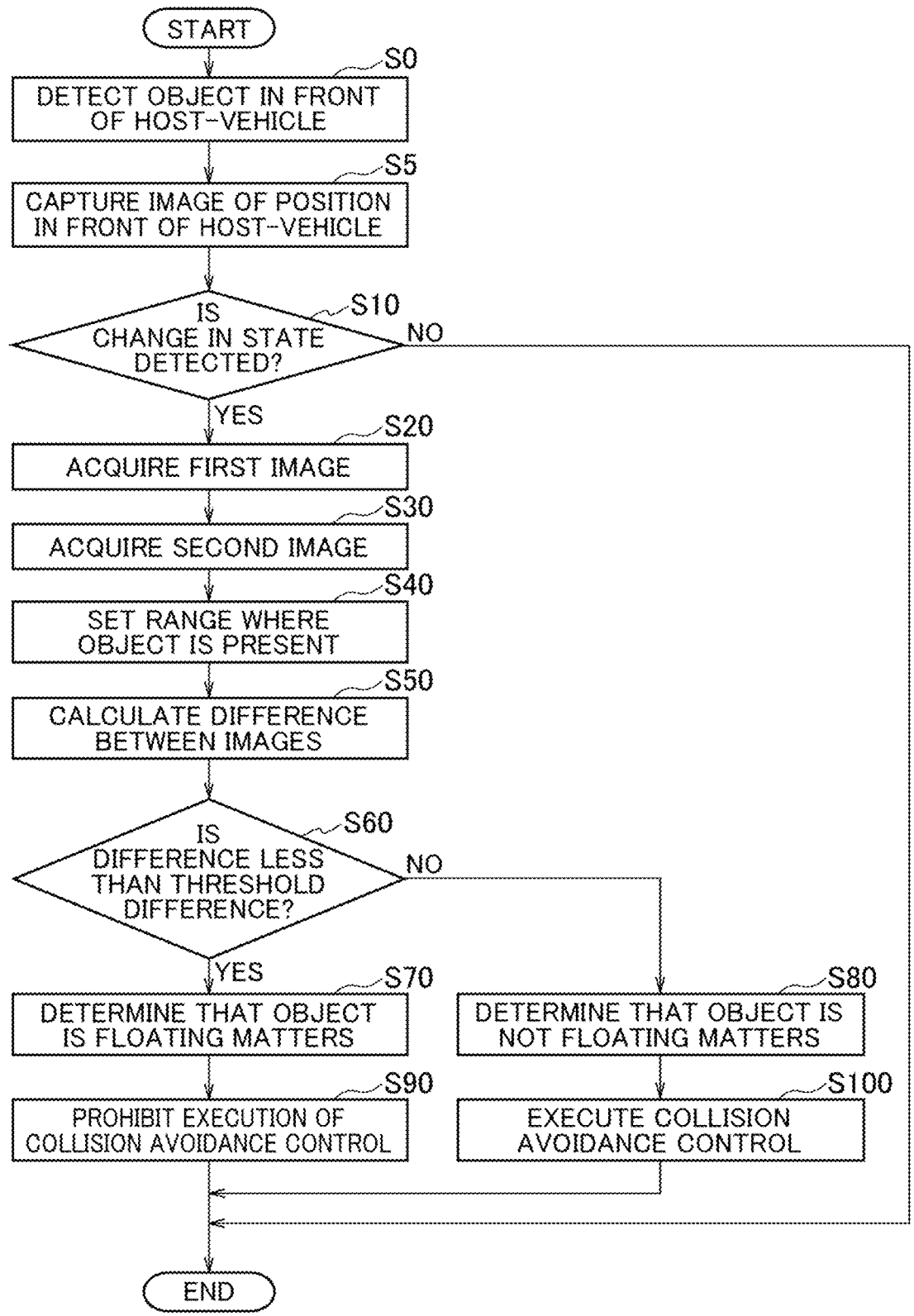
FIG. 2 is a flowchart showing processing in which the object detecting device according to the first embodiment determines whether an object is floating matters.

Next, with reference to FIG. 2, a description will be given regarding an example of how the object detecting device in FIG. 1 determines whether a detected object is floating matters. The operation of the object detecting device shown in the flowchart of FIG. 2 starts at the same time as when an ignition switch or a power switch of the host-vehicle is turned on, and the processing ends when the ignition switch or the power switch is turned off.

In step S0, the radar 10 irradiates a position in front of the host-vehicle with electromagnetic waves and detects an object based on reflected waves of the electromagnetic waves. Specifically, the radar 10 detects whether an object is present and the position of the object.

In step S5, the camera 20 repeatedly captures images of the position in front of the host-vehicle at a prescribed cycle until the state changes from the state where an object is not detected to the state where an object is detected, and acquires multiple images of the position in front of the host-vehicle. The storage unit 40 stores multiple images of the position in front of the host-vehicle captured by the camera 20 in a time-sequential manner.

In step S10, the determination range determination unit 311 detects that the state where an object is not detected has changed to the state where an object is detected, based on the information output from the radar 10. If the determination range determination unit 311 detects that the state where an object is not detected has changed to the state where an object is detected (YES in step S10), the processing proceeds to step S20. Alternatively, if the determination range determination unit 311 does not detect that the state where an object is not detected has changed to the state where an object is detected (NO in step S10), the processing ends.

The processing proceeds to step S20, and the difference calculation unit 312 acquires, from the storage unit 40, the first optical image captured when the object is not detected.

The processing proceeds to step S30, and the determination range determination unit 311 acquires, from the camera 20, the second optical image captured when the object is detected.

The processing proceeds to step S40, and the determination range determination unit 311 acquires the position information of the object from the radar 10, and selects, from the second optical image, the pixel area corresponding to the position of the object detected by the radar 10. The determination range determination unit 311 sets the pixel area of the second optical image corresponding to the position of the detected object as the range of the image for determining whether the object is floating matters.

The processing proceeds to step S50, and the difference calculation unit 312 acquires, from the determination range determination unit 311, the second optical image and the range of the image for determining whether the object is floating matters, and calculates the difference between the first optical image and the second optical image at the same pixel positions in the pixel area of the image for determining whether the object is floating matters.

The processing proceeds to step S60, and if the difference determination unit 313 determines that the difference between the first optical image and the second optical image is less than the threshold difference (YES in step S60), the processing proceeds to step S70 and the difference determination unit 313 determines that the object is floating matters.

The processing proceeds to step S90, and the vehicle control unit 50 continues controlling the host-vehicle. That is, the vehicle control unit 50 prohibits the execution of control to avoid the situation where the distance to the object becomes less than the predetermined distance.

In step S60, if the difference determination unit 313 determines that the difference in brightness between the first optical image and the second optical image is the threshold difference or more (NO in step S60), the processing proceeds to step S80 and the difference determination unit 313 determines that the object is not floating matters.

The processing proceeds to step S100, and the vehicle control unit 50 controls the host-vehicle to avoid the situation where the distance to the object becomes less than the predetermined distance determined in advance.

As described above, according to the first embodiment, the following operations and effects can be obtained.

The object detecting device irradiates the position in front of the host-vehicle with electromagnetic waves and detects an object in front of the host-vehicle based on reflected waves of the electromagnetic waves used for irradiation. The object detecting device captures images of the position in front of the host-vehicle to acquire images, and when the state where the object is not detected changes to the state where the object is detected, the object detecting device determines whether the object is floating matters based on the images. That is, an object is detected by means of the reflected waves of the electromagnetic waves, and whether the detected object is floating matters is determined by means of the images. This enables the object detecting device to detect an object and determine whether the detected object is floating matters more accurately.

The object detecting device acquires the first optical image by capturing an image of the position in front of the host-vehicle when an object is not detected, and acquires the second optical image by capturing an image of the position in front of the host-vehicle when the object is detected. The object detecting device calculates the difference between the first optical image and the second optical image, and determines that the object is floating matters if the difference is less than the threshold difference. This enables the object detecting device to determine whether the object is floating matters when the object is detected, and to determine more quickly whether the object is floating matters.

First Modified Example of First Embodiment

Figure 3:
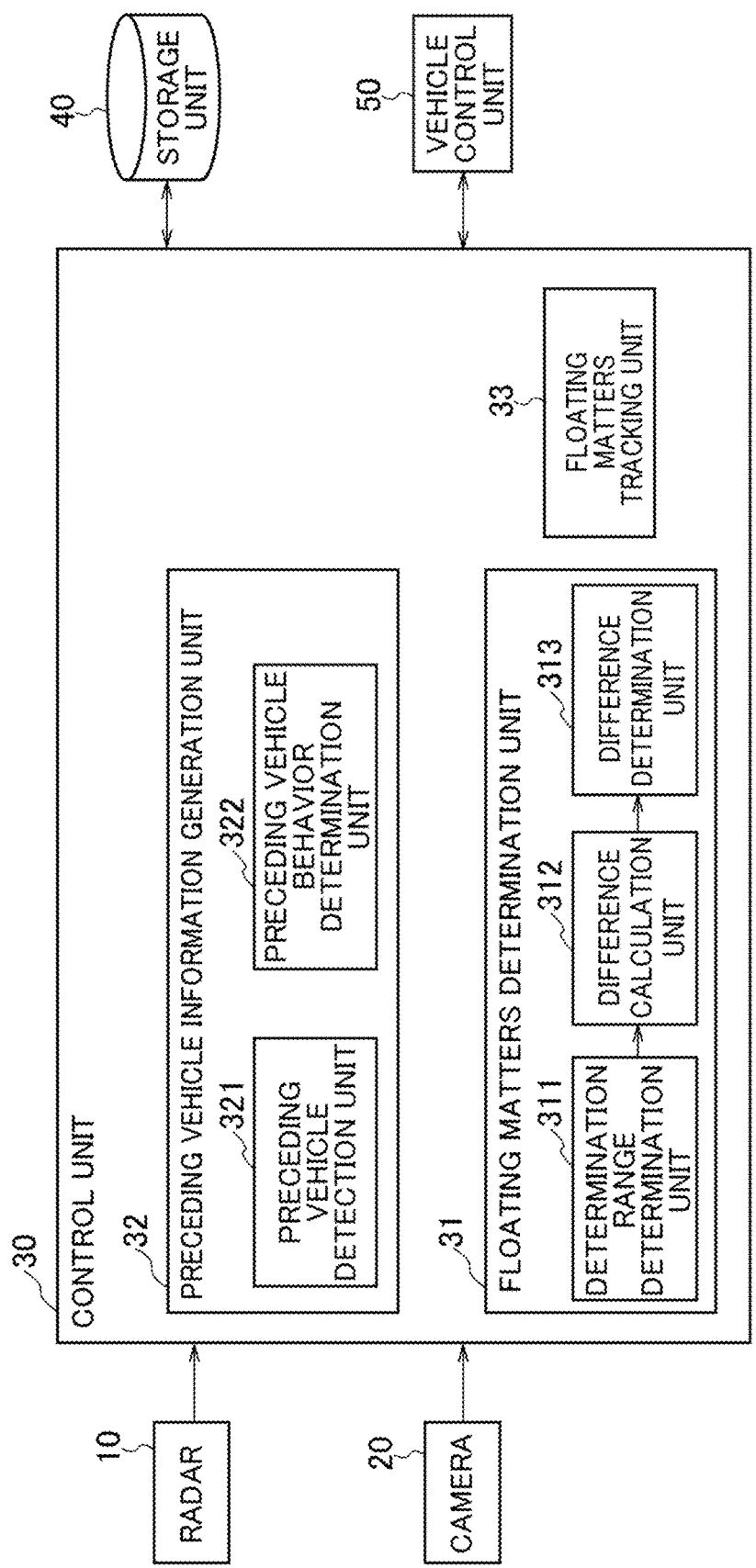
FIG. 3 is a block diagram showing the configuration of an object detecting device according to a first modified example of the first embodiment.

[Configuration of Object Detecting Device]
The configuration of an object detecting device according to a first modified example of the first embodiment will be described with reference to FIG. 3. The differences from the first embodiment lie in that the control unit 30 further includes a preceding vehicle information generation unit 32 and floating matters tracking unit 33, and in part of the processing performed by the determination range determination unit 311. Therefore, only the differences will be described, and descriptions of other common configurations will be omitted.

The preceding vehicle information generation unit 32 determines whether a detected object is a preceding vehicle in front of the host-vehicle, and measures the behavior of the preceding vehicle if the object is a preceding vehicle. Then, the preceding vehicle information generation unit 32 determines whether the behavior of the preceding vehicle is within a threshold behavior. The preceding vehicle information generation unit 32 includes a preceding vehicle detection unit 321 and a preceding vehicle behavior determination unit 322.

The preceding vehicle detection unit 321 determines whether the detected object is a preceding vehicle. Specifically, the preceding vehicle detection unit 321 acquires a distance to each position of the object measured by the radar 10, and specifies the shape and size of the object based on the distance to each position of the object. The preceding vehicle detection unit 321 determines whether the object is a preceding vehicle based on the shape and size of the object. Specifically, the preceding vehicle detection unit 321 calculates a matching rate between the shape and size of the specified object and the shape and size of a vehicle stored in advance in the storage unit 40, and if the matching rate is higher than a threshold matching rate, the preceding vehicle detection unit 321 determines that the object is a preceding vehicle.

In the present embodiment, the preceding vehicle detection unit 321 determines whether an object is a preceding vehicle based on a distance to each position of the object measured by the radar 10, but whether the object is a preceding vehicle may be determined based on an image acquired by the camera 20. The determination as to whether an object is a preceding vehicle performed by means of image analysis is possible by using known image recognition technology.

If a preceding vehicle is detected by the preceding vehicle detection unit 321, the preceding vehicle behavior determination unit 322 acquires the speed of the preceding vehicle from a time change in the distance to the preceding vehicle, that is, the speed relative to the host-vehicle and the speed of the host-vehicle, and determines the behavior of the preceding vehicle.

Specifically, the preceding vehicle behavior determination unit 322 detects that the preceding vehicle has started moving from a stopped state (less than 0.5 km/h) from a change in the speed of the preceding vehicle, and determines whether a threshold time has elapsed from when the preceding vehicle has started moving. The threshold time is three seconds, for example.

Further, the preceding vehicle behavior determination unit 322 determines whether the speed of the preceding vehicle is less than a threshold speed. The threshold speed is 10 km/h, for example.

The preceding vehicle behavior determination unit 322 detects that the preceding vehicle has started moving from a stopped state, and if the threshold time has not elapsed from when the preceding vehicle has started moving, the preceding vehicle behavior determination unit 322 determines that the behavior of the preceding vehicle is within the threshold behavior. Alternatively, if the speed of the preceding vehicle is less than the threshold speed, the preceding vehicle behavior determination unit 322 determines that the behavior of the preceding vehicle is within the threshold behavior.

If the preceding vehicle is detected and the determination range determination unit 311 detects that a state where an object is not detected behind the preceding vehicle has changed to a state where an object is detected, the determination range determination unit 311 sets the pixel area of the second optical image corresponding to the position of the object as the range of the image for determining whether the object is floating matters.

The floating matters tracking unit 33 tracks the object determined as being floating matters by the floating matters determination unit 31. Specifically, the floating matters tracking unit 33 sets the object determined as being floating matters by the difference determination unit 313 as a tracked object, and tracks the floating matters by using the images acquired by the camera 20 or the radar 10. Note that the floating matters tracking unit 33 may track the object by using both images acquired by the camera 20 and the radar 10. The floating matters tracking unit 33 outputs the object being tracked to the floating matters determination unit 31.

[Object Detection Method]

Figure 4:
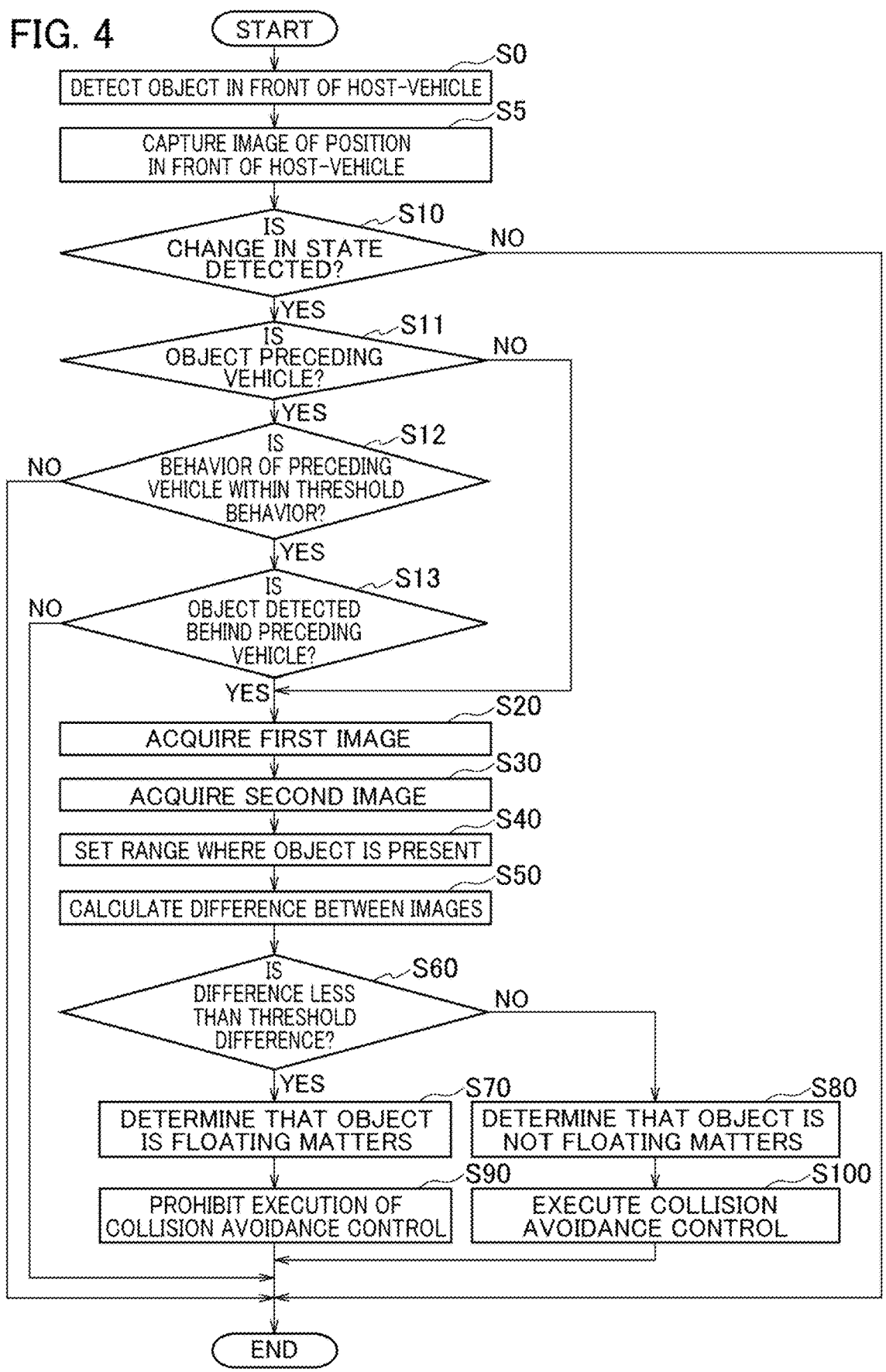
FIG. 4 is a flowchart showing processing in which the object detecting device according to the first modified example of the first embodiment determines whether an object is floating matters.

Next, with reference to FIG. 4, a description will be given regarding an example of how the object detecting device shown in FIG. 3 determines whether a detected object is floating matters. The difference from the first embodiment is that steps S11 to S13 are further provided. Therefore, only the difference will be described, and descriptions of other common processing will be omitted.

In step S11, the preceding vehicle detection unit 321 acquires the distance to each position of the object measured by the radar 10, and specifies the shape and size of the object from the distance to each position of the object. The preceding vehicle detection unit 321 determines whether the object is the preceding vehicle based on the shape and size of the object. If the preceding vehicle detection unit 321 determines that the object is the preceding vehicle (YES in step S11), the processing proceeds to step S12. Alternatively, if the preceding vehicle detection unit 321 determines that the object is not the preceding vehicle (NO in step S11), the processing proceeds to step S20.

In step S12, the preceding vehicle behavior determination unit 322 acquires the speed of the preceding vehicle from the radar 10 and determines the behavior of the preceding vehicle. Specifically, the preceding vehicle behavior determination unit 322 detects that the preceding vehicle has started moving from a stopped state and determines that the behavior of the preceding vehicle is within the threshold behavior if the threshold time has not elapsed from when the preceding vehicle has started moving or if the speed of the preceding vehicle is less than the threshold speed. If the preceding vehicle behavior determination unit 322 determines that the behavior of the preceding vehicle is within the threshold behavior (YES in step S12), the processing proceeds to step S13. Alternatively, if the preceding vehicle behavior determination unit 322 determines that the behavior of the preceding vehicle is not within the threshold behavior (NO in step S12), the processing ends.

In step S13, if the determination range determination unit 311 detects that the state where an object behind the preceding vehicle is not detected has changed to the state where an object is detected (YES in step S13), the processing proceeds to step S20. Alternatively, if the determination range determination unit 311 does not detect that the state where an object behind the preceding vehicle is not detected has changed to the state where an object is detected (NO in step S13), the processing ends.

Figure 5:
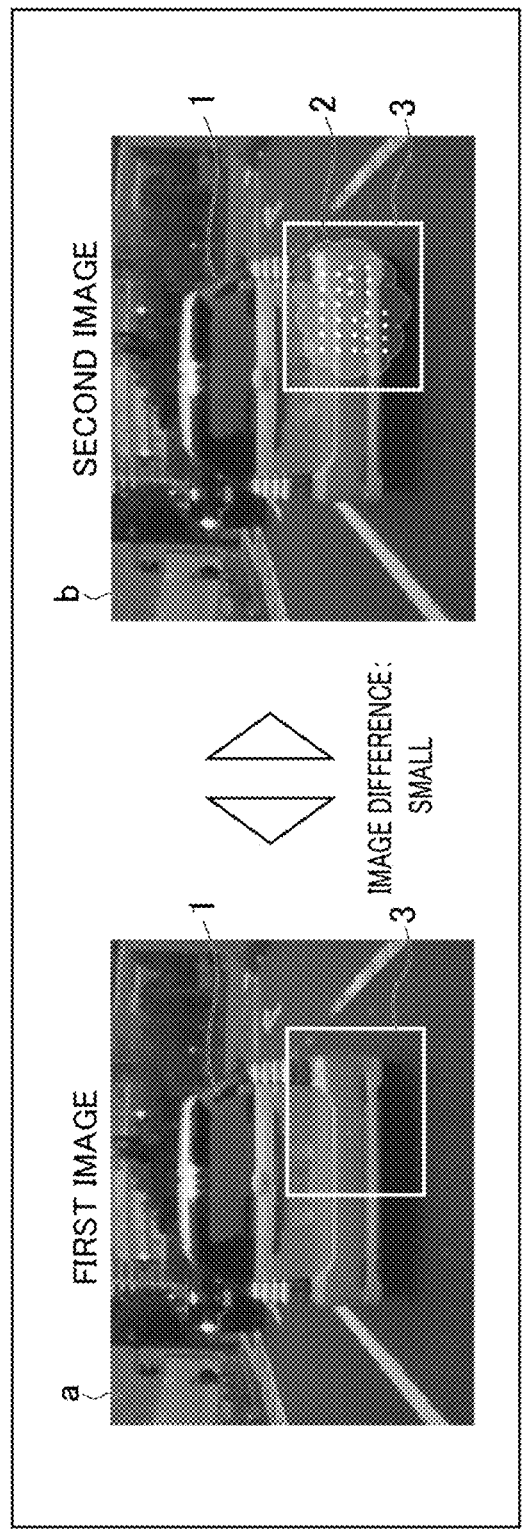
FIG. 5 is a conceptual diagram showing processing in which the object detecting device according to the first modified example of the first embodiment determines that an object is floating matters.
Figure 6:
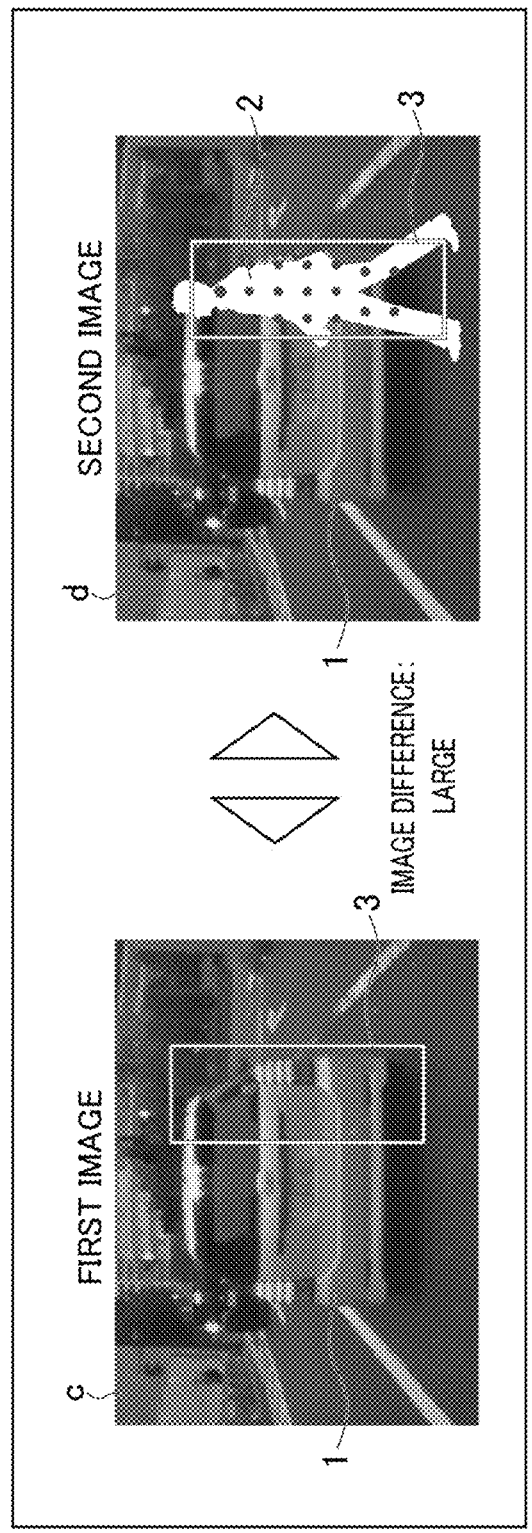
FIG. 6 is a conceptual diagram showing processing in which the object detecting device according to the first modified example of the first embodiment determines that an object is not floating matters.

With reference to FIGS. 5 and 6, a specific description will be given regarding processing in which the object detecting device according to the first modified example of the first embodiment determines whether the object detected behind the preceding vehicle which has been detected is floating matters.

First, with reference to FIG. 5, a description will be given regarding processing in which the object detecting device according to the first modified example of the first embodiment determines that an object located behind the preceding vehicle in front of the host-vehicle is floating matters.

Suppose that the radar 10 detects an object 1 at the time when the camera 20 acquires a first optical image a. In the above case, the preceding vehicle detection unit 321 acquires the distance to each position of the object 1 measured by the radar 10 and determines that the object 1 is a preceding vehicle based on the shape and size of the object.

The preceding vehicle behavior determination unit 322 acquires the speed of the preceding vehicle from the radar 10 and determines the behavior of the preceding vehicle. At the time when the first optical image a and a second optical image b are acquired by the camera 20, the speed of the preceding vehicle is less than the threshold speed. Therefore, the preceding vehicle behavior determination unit 322 determines that the behavior of the preceding vehicle is within the threshold behavior.

If the radar 10 detects an object 2 behind the preceding vehicle at the time when the camera 20 acquires the second optical image b, the determination range determination unit 311 detects that a state where the object 2 is not detected has changed to a state where the object 2 is detected.

The difference calculation unit 312 acquires, from the storage unit 40, the first optical image a captured when the object 2 behind the preceding vehicle has not been detected, and the determination range determination unit 311 acquires, from the camera 20, the second optical image b captured when the object 2 behind the preceding vehicle has been detected.

The determination range determination unit 311 sets a pixel area of the second optical image b corresponding to the position of the object 2 detected by the radar 10 as an image range 3 for determining whether the object 2 is floating matters.

The difference calculation unit 312 acquires, from the determination range determination unit 311, the second optical image b and the image range 3 for determining whether the object 2 is floating matters, and calculates the difference between the first optical image a and the second optical image b at the same pixel positions in the image range 3 for determining whether the object 2 is floating matters.

The difference between the first optical image a and the second optical image b is less than the threshold difference. Therefore, the difference determination unit 313 determines that the object 2 is floating matters.

Next, with reference to FIG. 6, a description will be given regarding processing in which the object detecting device according to the first modified example of the first embodiment determines that the object 2 located behind the preceding vehicle in front of the host-vehicle is not floating matters.

The difference from FIG. 5 is that the object 2 behind the preceding vehicle is a pedestrian. Therefore, the processing of setting the pixel area to the image range 3 for determining whether the object 2 is floating matters and thereafter are different from the processing described for FIG. 5. Therefore, only the differences from the processing described for FIG. 5 will be described.

The determination range determination unit 311 sets a pixel area of a second optical image d corresponding to the position of the object 2 detected by the radar 10 as the image range 3 for determining whether the object 2 is floating matters.

The difference calculation unit 312 acquires, from the determination range determination unit 311, the second optical image d and the image range 3 for determining whether the object 2 is floating matters, and calculates the difference between a first optical image c and the second optical image d at the same pixel positions in the image range 3 for determining whether the object 2 is floating matters.

The difference between the first optical image c and the second optical image d is the threshold difference or more. Therefore, the difference determination unit 313 determines that the object 2 is not floating matters.

As described above, according to the first modified example of the first embodiment, the following operations and effects can be obtained in addition to the operations and effects of the first embodiment.

If an object is located behind a preceding vehicle in front of the host-vehicle and the preceding vehicle starts moving from a stopped state, the object detecting device determines whether the object is floating matters until the threshold time elapses from when the preceding vehicle has started moving. The vehicle generates more floating matters such as exhaust gas, splashes of water, and dust when starting to move. Therefore, the object detecting device can determine that matters such as exhaust gas, splashes of water, and dust generated when the preceding vehicle in front of the host-vehicle starts moving are floating matters by determining whether the detected objects are floating matters until a prescribed time elapses from when the preceding vehicle has started moving.

The object detecting device determines whether an object is floating matters if the object is located behind the preceding vehicle in front of the host-vehicle and the speed of the preceding vehicle is less than the threshold speed. If the preceding vehicle is traveling at a speed less than the threshold speed, there is a high possibility that the preceding vehicle will accelerate thereafter. The vehicle generates more floating matters, such as exhaust gas, splashes of water, and dust when accelerating. Therefore, the object detecting device can determine that matters such as exhaust gas, splashes of water, and dust generated when the preceding vehicle in front of the host-vehicle accelerates are floating matters by determining whether detected objects are floating matters when the speed of the preceding vehicle is less than the threshold speed.

By tracking floating matters, the object detecting device can reduce the processing of determining again whether an object that has once been determined as being floating matters is floating matters. Therefore, the object detecting device can reduce the load on the processing of determining whether a detected object is floating matters.

Second Modified Example of First Embodiment

[Configuration of Object Detecting Device]

Figure 7:
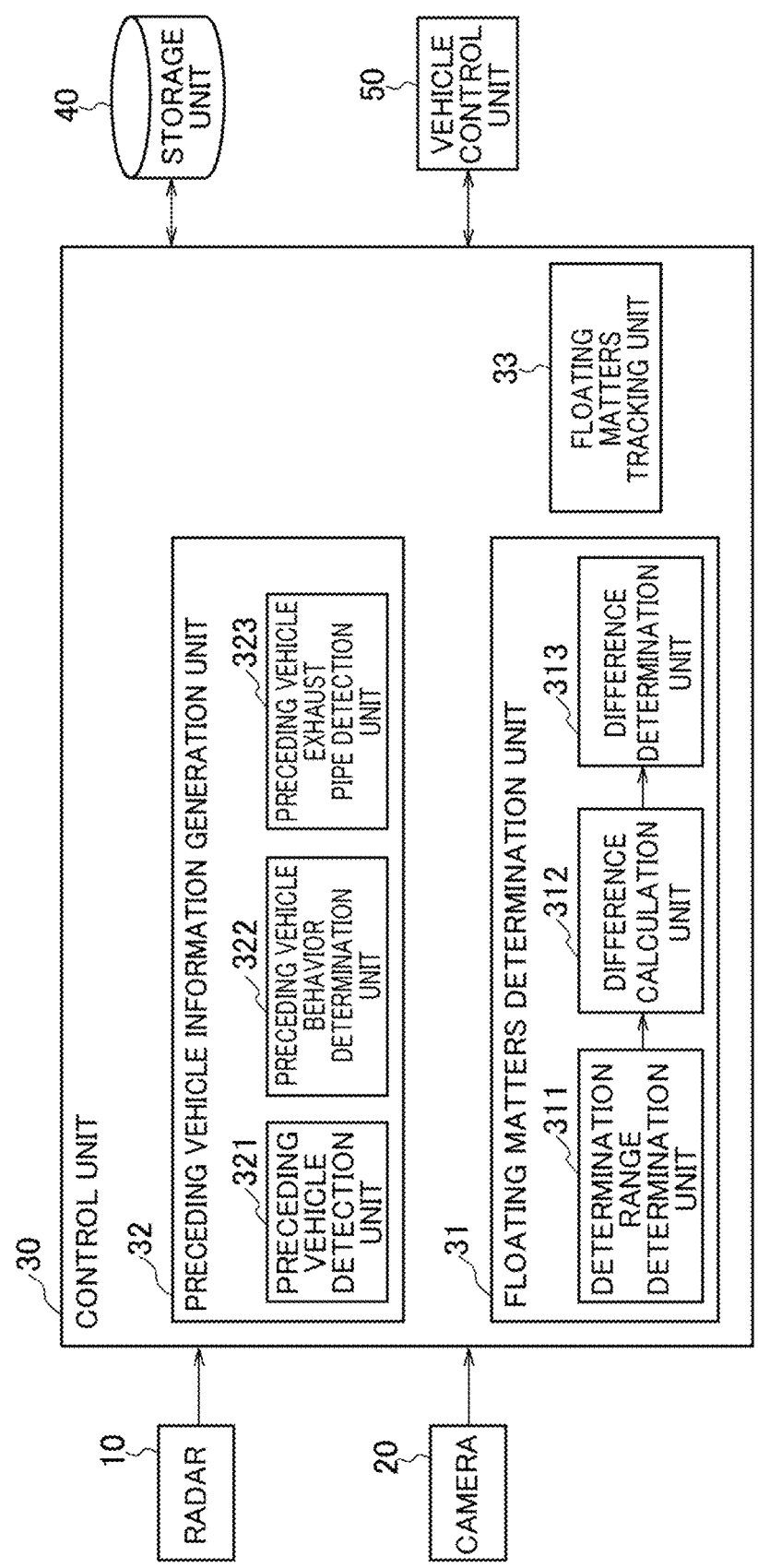
FIG. 7 is a block diagram showing the configuration of an object detecting device according to a second modified example of the first embodiment.

The configuration of an object detecting device according to a second modified example of the first embodiment will be described with reference to FIG. 7. The differences from the first modified example of the first embodiment are that the preceding vehicle information generation unit 32 further includes a preceding vehicle exhaust pipe detection unit 323, and part of the processing performed by the determination range determination unit 311. Therefore, only the differences will be described, and descriptions of other common configurations will be omitted.

The preceding vehicle exhaust pipe detection unit 323 detects an exhaust pipe of a preceding vehicle detected by the preceding vehicle detection unit 321 from an image acquired by the camera 20. Specifically, the preceding vehicle exhaust pipe detection unit 323 detects a portion similar to the shape of a vehicle exhaust pipe, stored in advance in the storage unit 40, from the pixel positions of the image corresponding to a portion from a height that is ⅕ of the total height of the preceding vehicle to the ground, and identifies the portion as the exhaust pipe of the preceding vehicle.

If the exhaust pipe of the preceding vehicle is detected by the preceding vehicle exhaust pipe detection unit 323, the determination range determination unit 311 sets the range of the image for determining whether an object is floating matters according to the position of the exhaust pipe of the preceding vehicle. Specifically, the determination range determination unit 311 acquires an image from the camera 20 and sets a pixel area of the image corresponding to the preceding vehicle, which is a pixel area of a predetermined range above the detected exhaust pipe as the range of the image for determining whether an object is floating matters. The pixel area of the predetermined range is a pixel area of a range corresponding to a predetermined distance range for the exhaust pipe. The predetermined distance range is, for example, one meter. If the exhaust pipe of the preceding vehicle is detected, the determination range determination unit 311 determines whether an object is detected in the pixel area of the predetermined range above the exhaust pipe, which is the range of the image for determining whether an object is floating matters.

If the exhaust pipe of the preceding vehicle is not detected by the preceding vehicle exhaust pipe detection unit 323, the determination range determination unit 311 sets the pixel area of the second image corresponding to the position of a detected object as the range of the image for determining whether the object is floating matters.

[Object Detection Method]

Figure 8:
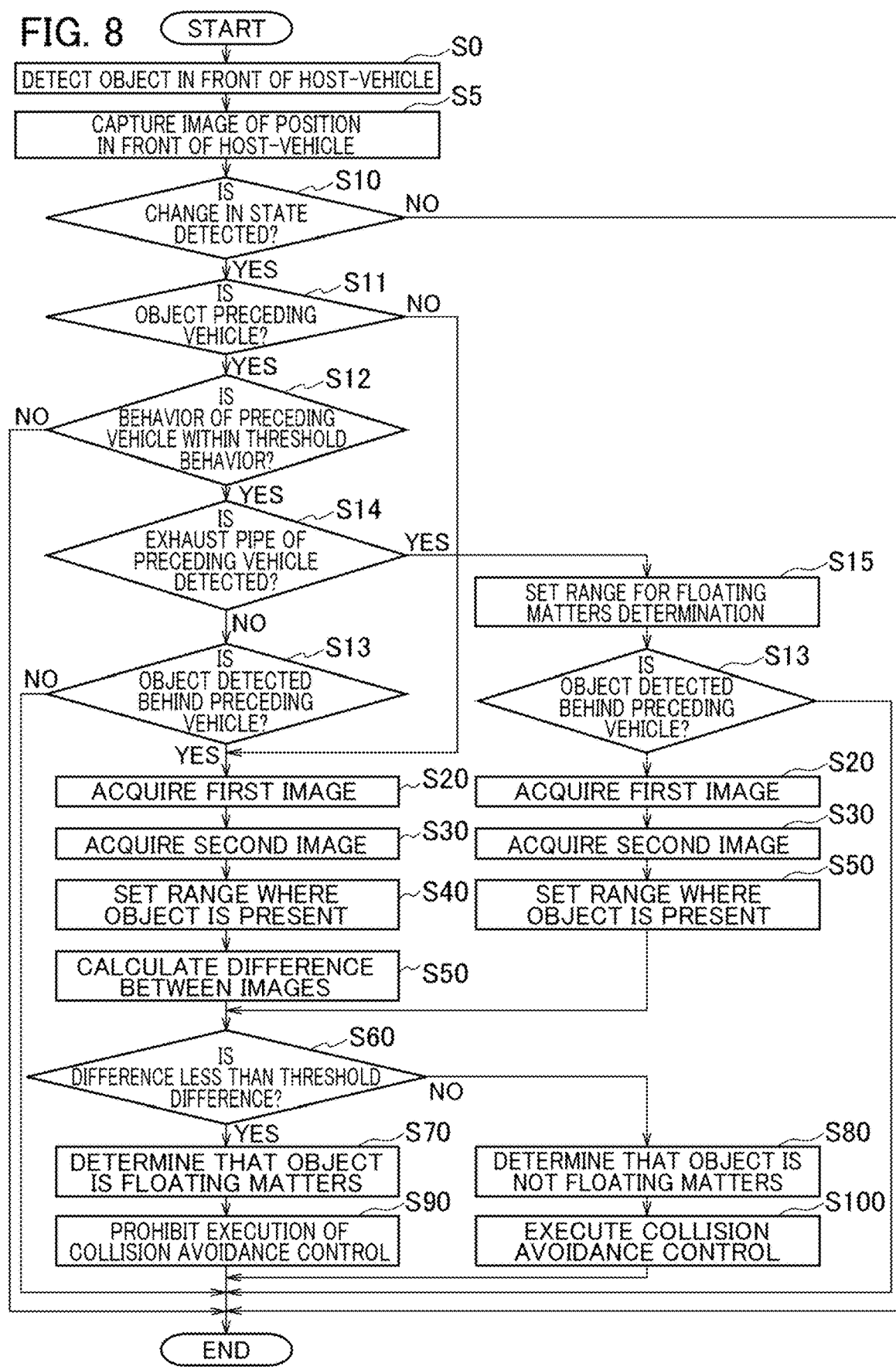
FIG. 8 is a flowchart showing processing in which the object detecting device according to the second modified example of the first embodiment determines whether an object is floating matters.

Next, with reference to FIG. 8, a description will be given regarding an example of how the object detecting device shown in FIG. 7 determines whether a detected object is floating matters. The differences from the first modified example of the first embodiment are that step S14 and step S15 are further provided, and that step S40 is deleted in the processing after step S15. Therefore, only the differences will be described, and descriptions of other common processing will be omitted.

In step S14, the preceding vehicle exhaust pipe detection unit 323 detects the exhaust pipe of the preceding vehicle from the image acquired by the camera 20. If the preceding vehicle exhaust pipe detection unit 323 detects the exhaust pipe of the preceding vehicle (YES in step S14), the processing proceeds to step S15. Alternatively, if the preceding vehicle exhaust pipe detection unit 323 does not detect the exhaust pipe of the preceding vehicle (NO in step S14), the processing proceeds to step S13.

In step S15, the determination range determination unit 311 sets the range of the image for determining whether an object is floating matters according to the position of the exhaust pipe of the preceding vehicle. Specifically, the determination range determination unit 311 acquires an image from the camera 20 and sets a pixel area of the image corresponding to the preceding vehicle, which is a pixel area of the predetermined range above the detected exhaust pipe, as the range of the image for determining whether an object is floating matters. After the range of the image is set, the processing proceeds to step S13.

In step S13, if the exhaust pipe of the preceding vehicle is detected and the determination range determination unit 311 detects that a state where an object is not detected in the pixel area of the predetermined range above the exhaust pipe has changed to a state where an object is detected (YES in step S13), the processing proceeds to step S20. Alternatively, if the determination range determination unit 311 does not detect that the state where an object is not detected in the pixel area of the predetermined range above the exhaust pipe has changed to the state where an object is detected (NO in step S13), the processing ends.

As described above, according to the second modified example of the first embodiment, the following operations and effects can be obtained in addition to the operations and effects of the first modified example of the first embodiment.

If an object is located behind the preceding vehicle in front of the host-vehicle and the exhaust pipe of the preceding vehicle is detected, the object detecting device sets the range of the image for determining whether the object is floating matters according to the position of the exhaust pipe of the preceding vehicle. This enables the object detecting device to more accurately determine exhaust gas generated by the preceding vehicle as floating matters.

Second Embodiment

[Configuration of Object Detecting Device]

Figure 9:
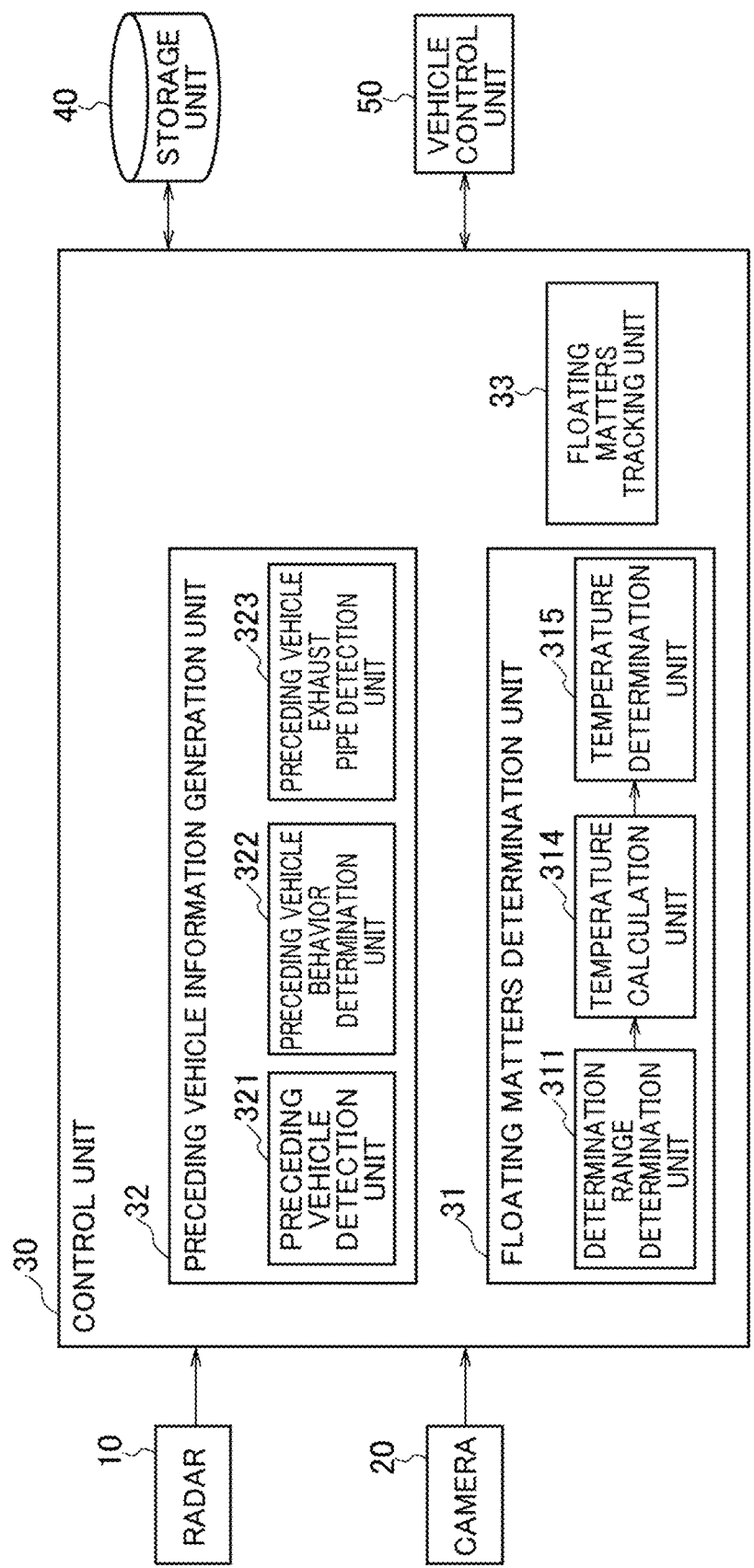
FIG. 9 is a block diagram showing the configuration of an object detecting device according to a second embodiment.

The configuration of an object detecting device according to a second embodiment will be described with reference to FIG. 9. The differences from the second modified example of the first embodiment are the specification of the camera 20, part of the processing performed by the determination range determination unit 311, and that a temperature calculation unit 314 and a temperature determination unit 315 are provided instead of the difference calculation unit 312 and the difference determination unit 313. Therefore, only the differences will be described, and a descriptions of other common configurations will be omitted.

The camera 20 captures an image of the position in front of the host-vehicle, measures the luminance of infrared light, and acquires an infrared image showing the luminance of infrared light.

If the exhaust pipe of the preceding vehicle is detected by the preceding vehicle exhaust pipe detection unit 323, the determination range determination unit 311 sets a pixel area of a predetermined range above the detected exhaust pipe, which is a pixel area of the infrared image corresponding to the preceding vehicle, as the range of the image for determining whether an object is floating matters.

If the exhaust pipe of the preceding vehicle is not detected by the preceding vehicle exhaust pipe detection unit 323, the determination range determination unit 311 sets the pixel area in the infrared image corresponding to the position of a detected object as the range of the image for determining whether the object is floating matters.

The temperature calculation unit 314 calculates the temperature of the object based on the luminance of the infrared light at the position corresponding to the object in the infrared image. Specifically, if the state where an object behind the preceding vehicle is not detected has changed to the state where an object is detected, the temperature calculation unit 314 acquires the infrared image captured when the object is detected, and calculates the temperature of the object in the range of the image for determining whether the object is floating matters, from the luminance of the infrared image at the corresponding position.

The temperature calculation unit 314 calculates the amount of change in the temperature of the object based on the luminance of the infrared light at the position corresponding to the object in the infrared image. Specifically, if the exhaust pipe of the preceding vehicle is detected and the state where an object is not detected in the range of the image for determining whether an object is floating matters changes to the state where an object is detected, the temperature calculation unit 314 calculates the amount of change in the temperature of the object in the range of the image from the amount of change in the luminance of the infrared image at the corresponding position.

Note that the luminance of the image in the infrared image changes due to the temperature. That is, the amount of change in the temperature corresponds to the amount of change in the luminance of the image. Therefore, the temperature calculation unit 314 can calculate the amount of change in the temperature from the amount of change in the luminance of the infrared image when the state where an object is not detected changes to the state where an object is detected. The temperature calculation unit 314 may calculate the amount of change in the luminance of the infrared image instead of the amount of change in the temperature.

If the exhaust pipe of the preceding vehicle is not detected and the temperature at the position corresponding to the range of the image for determining whether an object is floating matters is a threshold temperature or higher, the temperature determination unit 315 determines that the object is floating matters. The threshold temperature is, for example, 50° C.

If the exhaust pipe of the preceding vehicle is detected, the temperature of an object in the range of the image for determining whether the object is floating matters is less than the threshold temperature, and the amount of change in the temperature of the object in the range of the image is a threshold amount of change or more, the temperature determination unit 315 determines that the object is floating matters. The threshold temperature is, for example, 50° C. and the threshold amount of change is, for example, 20° C.

The temperature determination unit 315 sets a threshold temperature that is set to be higher as the outside air temperature increases. Specifically, the temperature determination unit 315 changes the threshold temperature within a range of the temperature of exhaust gas obtained in advance by means of an experiment or the like. For example, the threshold temperature is set to 50° C. when the outside air temperature is 25° C., and each time the outside air temperature increases by 1° C., the threshold temperature is set to increase by 1° C.

[Object Detection Method]

Figure 10B:
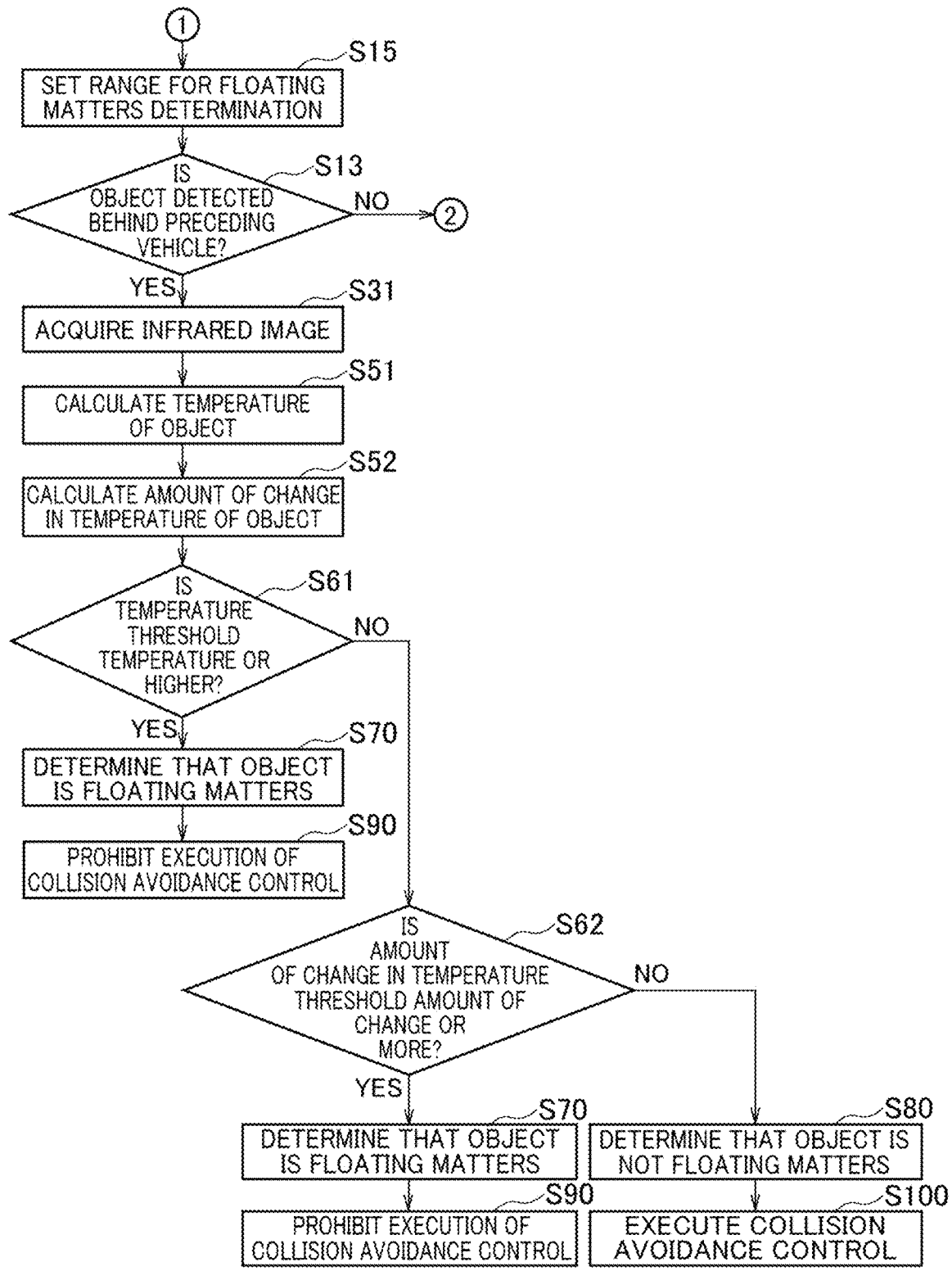
FIG. 10B is a flowchart showing the processing in which the object detecting device according to the second embodiment determines whether the object is floating matters.

Next, with reference to FIGS. 10A and 10B, a description will be given regarding an example of how the object detecting device shown in FIG. 9 determines whether the detected object is floating matters. The difference from the second modified example of the first embodiment is that processing of steps S31, S51, S52, S61, and S62 is performed instead of processing of steps S20, S30, and S50. Therefore, only the difference will be described, and descriptions of other common processing will be omitted.

In step S31, the determination range determination unit 311 acquires, from the camera 20, the infrared image captured when an object is detected by the radar 10.

In step S51, the temperature calculation unit 314 calculates the temperature of the detected object based on the luminance of the infrared light at the position corresponding to the object in the infrared image. Specifically, the temperature calculation unit 314 acquires the range of the image for determining whether the object is floating matters from the determination range determination unit 311, and calculates the temperature of the object in the range of the infrared image for determining whether the object is floating matters, in the infrared image captured when the object is detected.

In step S52, the temperature calculation unit 314 calculates the amount of change in the temperature of the detected object based on the luminance of the infrared light at the position corresponding to the object in the infrared image. Specifically, if the exhaust pipe of the preceding vehicle is detected and the state where the object is not detected in the range of the image for determining whether the object is floating matters changes to the state where the object is detected, the temperature calculation unit 314 calculates the amount of change in the temperature of the object in the range of the image from the amount of change in the luminance of the infrared image at the corresponding position.

In step S52, the temperature calculation unit 314 may calculate the amount of change in the luminance of the infrared image instead of the amount of change in the temperature. If the amount of change in the luminance of the infrared image is used, the determination as to whether the amount of change in the temperature is the threshold amount of change or more in step S62, which will be described later, is the determination as to whether the amount of change in the luminance of the infrared image is a threshold amount of change in luminance.

In step S61, if the temperature determination unit 315 determines that the temperature of the object is the threshold temperature or higher (YES in step S61), the processing proceeds to step S70. If the exhaust pipe of the preceding vehicle is detected (YES in step S13), and in step S61, the temperature determination unit 315 determines that the temperature of the object is less than the threshold temperature (NO in step S61), the processing proceeds to step S62.

If in step S62, the temperature determination unit 315 determines that the amount of change in the temperature of the object is the threshold amount of change or more (YES in step S62), the processing proceeds to step S70. In step S62, if the temperature determination unit 315 determines that the amount of change in the temperature of the object is less than the threshold amount of change (NO in step S62), the processing proceeds to step S80.

As described above, according to the second embodiment, the following operations and effects can be obtained.

The object detecting device captures an image of the position in front of the host-vehicle to acquire an infrared image, and calculates the temperature of an object based on the luminance of the infrared light at the position corresponding to the object in the infrared image. If the temperature of the object is the threshold temperature or higher, the object detecting device determines that the object is floating matters. This enables the object detecting device to determine whether the object is floating matters based on the temperature of the object, and more accurately determine vehicle exhaust gas having a temperature which is equal to or greater than the threshold temperature as floating matters.

If the object detecting device detects the exhaust pipe of the preceding vehicle, the object detecting device sets the range of the infrared image for determining whether the object is floating matters according to the position of the exhaust pipe of the preceding vehicle. The object detecting device calculates the amount of change in the temperature of the object detected in the range of the infrared image for determining whether the object is floating matters from the amount of change in the luminance of the infrared image of the corresponding position, and determines that the object is floating matters if the amount of change in the temperature of the detected object is the threshold amount of change or more. If the amount of change in temperature of the object detected in the range of the infrared image for determining whether the object is floating matters is the threshold amount of change or more, there is a high possibility that the preceding vehicle is emitting exhaust gas that is floating matters. Therefore, it is possible to more accurately determine the exhaust gas emitted by the preceding vehicle as floating matters.

The object detecting device sets the threshold temperature to be higher as the outside air temperature increases. The temperature of the exhaust gas at an exhaust pipe outlet is higher than the surface temperature of a human body. However, since the surface temperature of the human body increases as the outside air temperature increases, the difference between the surface temperature of the human body and the temperature of the exhaust gas decreases as the outside air temperature increases. Therefore, by setting the threshold temperature to be higher as the outside air temperature increases, the object detecting device can prevent the human body from being erroneously determined as floating matters and can more accurately determine an object as floating matters.

The present embodiment has presented an example where if the temperature of an object is determined as being less than the threshold temperature in step S61, the processing proceeds to step S62, and determination as to whether the object is floating matters is made by determining whether the amount of change in the temperature is a predetermined value or more in step S62, but the present embodiment is not limited thereto.

For example, the determination as to whether the temperature of the object is the threshold temperature or higher in step S61 may be omitted, and whether the object is floating matters may be determined based only on the determination as to whether the amount of change in the temperature is the threshold amount of change or more in step S62.

In addition, the determination as to whether the amount of change in the temperature is the threshold amount of change or more in step S62 may be the determination as to whether the amount of change in the luminance of the infrared image is the threshold amount of change in luminance or more based on the luminance change in the infrared image.

Further, the processing at step S62 and thereafter may be omitted, and if the temperature of the object is the threshold temperature or higher in step S61, the object may be determined as being floating matters, and if the temperature of the object is lower than the threshold temperature in step S61, the object may be determined as not being floating matters.

That is, in the present embodiment, if the temperature of the object is lower than the threshold temperature in step S61, the determination as to whether the amount of change in the temperature of the object is the threshold amount of change or more in step S62 is made. The reason why the determination as to whether the object is floating matters is made based on the above is to enhance the accuracy of determining floating matters by combining the processing in step S61 with the processing in step S62, but whether the object is floating matters can be determined based on either the processing in step S61 or the processing in step S62 alone.

Third Embodiment

[Configuration of Object Detecting Device]

Figure 11:
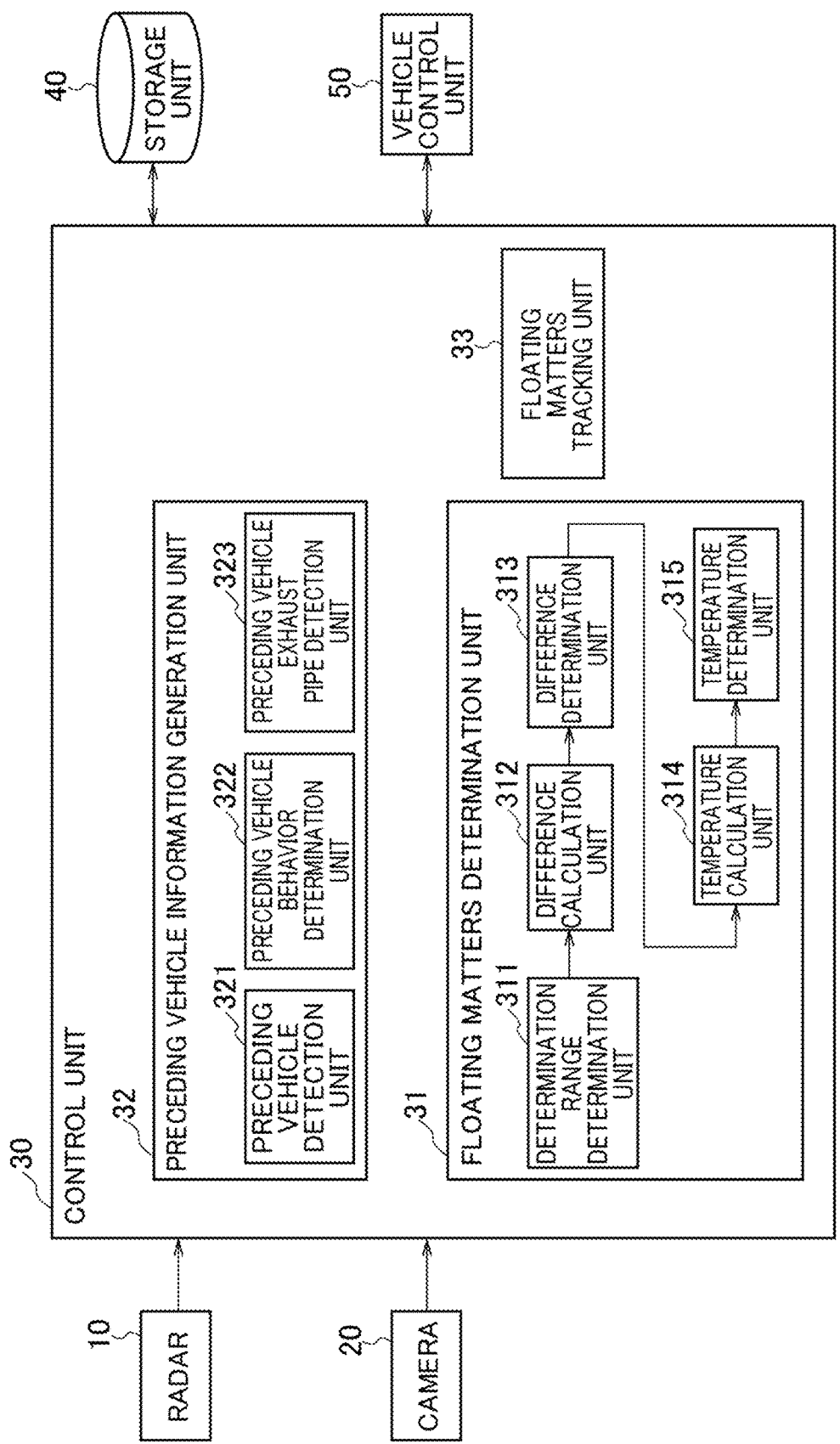
FIG. 11 is a block diagram showing the configuration of an object detecting device according to a third embodiment.

The configuration of an object detecting device according to a third embodiment will be described with reference to FIG. 11. The difference from the second embodiment is that a difference calculation unit 312 and a difference determination unit 313 are further provided. The difference calculation unit 312 and the difference determination unit 313 are common to those in the first embodiment, and therefore descriptions thereof are omitted.

[Object Detection Method]

Figure 12A:
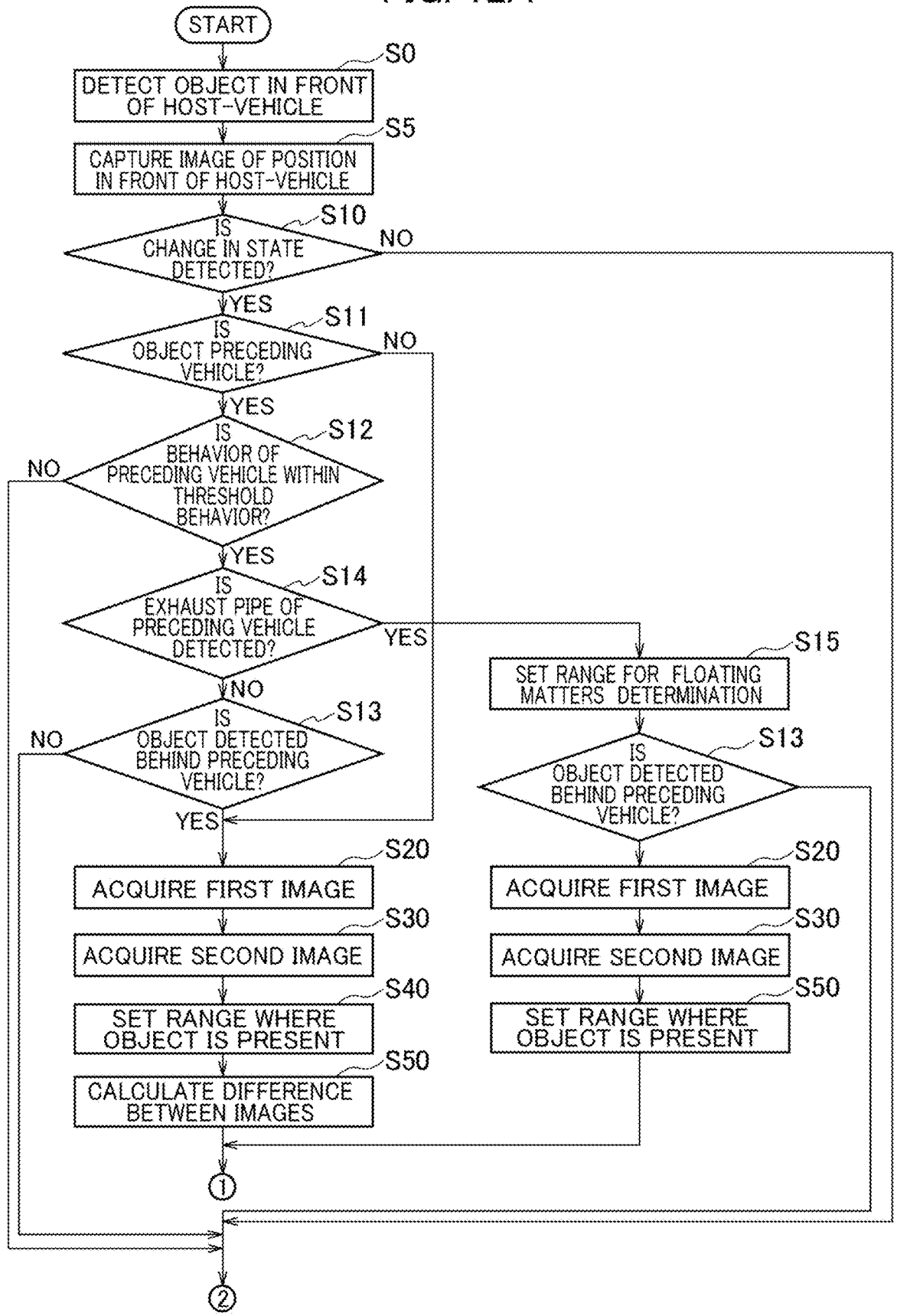
FIG. 12A is a flowchart showing the processing in which the object detecting device according to the third embodiment determines whether an object is floating matters.

Next, with reference to FIG. 12, a description will be given regarding an example of how the object detecting device shown in FIG. 11 determines whether a detected object is floating matters. In an object detection method according to the third embodiment, processing in the second modified example of the first embodiment and the processing in the second embodiment are connected by means of a conditional branch of step S60. Therefore, only the processing in step S60 will be described, and descriptions of other common processing will be omitted.

In step S60, if the difference determination unit 313 determines that a difference in luminance between the first optical image and the second optical image is less than the threshold difference (YES in step S60), processing proceeds to step S70 and the object is determined as being floating matters.

In step S60, if the difference determination unit 313 determines that the difference in luminance between the first optical image and the second optical image is the threshold difference or more (NO in step S60), the processing proceeds to step S11.

As described above, according to the third embodiment, the following operations and effects can be obtained.

The object detecting device acquires an optical image and an infrared image, and determines that an object is floating matters if the difference in luminance between the first optical image and the second optical image is the threshold difference or more and the temperature of the object is the threshold temperature or higher. Accordingly, in the case of floating matters in which the difference in luminance between the first optical image and the second optical image is the threshold difference or more, whether the object is floating matters can be determined from the temperature of the object calculated based on the infrared image. That is, in a state where vehicle exhaust gas, which is floating matters, remains still, the vehicle exhaust gas can be determined as being floating matters based on the temperature.

Although embodiments of the invention have been described as described above, the discussion and drawings forming part of this disclosure should not be construed as limiting the invention. Various alternative embodiments, examples, operational techniques will be apparent to those skilled in the art from this disclosure.

REFERENCE SIGNS LIST

10 Radar
20 Camera
30 Control unit
31 Floating matters determination unit
311 Determination range determination unit
312 Difference calculation unit
313 Difference determination unit
314 Temperature calculation unit
315 Temperature determination unit
32 Preceding vehicle information generation unit
321 Preceding vehicle detection unit
322 Preceding vehicle behavior determination unit
323 Preceding vehicle exhaust pipe detection unit
33 Floating matters tracking unit

The invention claimed is:

1. An object detection method comprising:
   irradiating a position in front of a host-vehicle with an electromagnetic wave;
   detecting an object in front of the host-vehicle based on a reflected wave of the electromagnetic wave;
   capturing an image of the position in front of the host-vehicle when the object is not detected to acquire a first image that is an optical image;
   capturing an image of the position in front of the host-vehicle when the object is detected to acquire a second image that is an optical image;
   calculating a difference between the first image and the second image when a state where the object is not detected changes to a state where the object is detected; and
   determining that the object is floating matters if the difference is less than a threshold difference.

2. The object detection method according to claim 1, comprising:
   acquiring an infrared image in addition to the optical image;
   calculating a temperature of the object based on luminance of infrared light at a position corresponding to the object in the infrared image; and
   determining that the object is floating matters if the difference between the first image and the second image is equal to or greater than the threshold difference and the temperature of the object is equal to or higher than a threshold temperature.

3. The object detection method according to claim 2, comprising:
   calculating an amount of change in the temperature of the object if the difference between the first image and the second image is equal to or greater than the threshold difference and the temperature of the object is lower than the threshold temperature; and
   determining that the object is floating matters if the amount of change in the temperature of the object is equal to or greater than a threshold amount of change.

4. The object detection method according to claim 1, wherein
   the object is located behind a preceding vehicle in front of the host-vehicle, and
   the object detection method comprises:
   if the preceding vehicle starts moving from a stopped state, determining whether the object is floating matters until a threshold time elapses from when the preceding vehicle has started moving.

5. The object detection method according to claim 1, wherein
   the object is located behind a preceding vehicle in front of the host-vehicle, and
   the object detection method comprises:
   determining whether the object is floating matters if a speed of the preceding vehicle is less than a threshold speed.

6. The object detection method according to claim 1, wherein
   the object is located behind a preceding vehicle in front of the host-vehicle, and the object detection method comprises:
if an exhaust pipe of the preceding vehicle is detected from the optical image or an infrared image, setting a range of the optical image or a range of the infrared image for determining whether the object is floating matters, according to a position of the exhaust pipe of the preceding vehicle.

7. The object detection method according to claim 1, comprising:
tracking the floating matters.

8. An object detection method comprising:
irradiating a position in front of a host-vehicle with an electromagnetic wave;
detecting an object in front of the host-vehicle based on a reflected wave of the electromagnetic wave;
capturing an image of the position in front of the host-vehicle to acquire an infrared image;
calculating an amount of change in a temperature of the object based on a change in luminance of infrared light at a position corresponding to the object in the infrared image when a state where the object is not detected changes to a state where the object is detected; and
determining that the object is floating matters if the amount of change in the temperature of the object is equal to or greater than a threshold amount of change.

9. The object detection method according to claim 8, comprising:
calculating the temperature of the object based on the luminance of the infrared light at the position corresponding to the object in the infrared image;
determining that the object is floating matters if the temperature of the object is equal to or higher than a threshold temperature;
calculating the amount of change in the temperature of the object if the temperature of the object is lower than the threshold temperature; and
determining that the object is floating matters if the amount of change in the temperature of the object is equal to or greater than the threshold amount of change.

10. The object detection method according to claim 9, wherein the threshold temperature is set to be higher as an outside air temperature increases.

11. An object detecting device comprising:
a sensor that irradiates a position in front of a host-vehicle with an electromagnetic wave and detects an object in front of the host-vehicle based on a reflected wave of the electromagnetic wave;
a camera that captures an image of the position in front of the host-vehicle to acquire an optical image; and
a controller configured to:
acquire a first image that is the optical image captured when the object is not detected;
acquire a second image that is the optical image captured when the object is detected;
calculate a difference between the first image and the second image when a state where the object is not detected changes to a state where the object is detected; and
determine that the object is floating matters if the difference is less than a threshold difference.

12. An object detecting device comprising:
a sensor that irradiates a position in front of a host-vehicle with an electromagnetic wave and detects an object in front of the host-vehicle based on a reflected wave of the electromagnetic wave;
a camera that captures an image of the position in front of the host-vehicle to acquire an infrared image; and
a controller configured to:
calculate an amount of change in a temperature of the object based on a change in luminance of infrared light at a position corresponding to the object in the infrared image when a state where the object is not detected changes to a state where the object is detected; and
determine that the object is floating matters if the amount of change in the temperature of the object is equal to or greater than a threshold amount of change.

* * * * *